(12) United States Patent
Cozma et al.

(10) Patent No.: US 12,417,159 B2
(45) Date of Patent: Sep. 16, 2025

(54) USING A TASK IDENTIFIER TO IDENTIFY PROCESSING SERVICES THAT HAVE PROCESSED A TASK

(71) Applicant: Lenovo Global Technology (United States) Inc., Morrisville, NC (US)

(72) Inventors: Alexandru Cozma, Bucharest (RO); Jeffrey J Van Heuklon, Rochester, MN (US); Ionut Dobre, Bucharest (RO); Ioana Voicu, Bucharest (RO)

( * ) Notice: Subject to any disclaimer, the term of this patent is extended or adjusted under 35 U.S.C. 154(b) by 611 days.

(21) Appl. No.: 17/708,151

(22) Filed: Mar. 30, 2022

(65) Prior Publication Data

US 2023/0315604 A1  Oct. 5, 2023

(51) Int. Cl.
*G06F 9/46* (2006.01)
*G06F 9/48* (2006.01)
*G06F 11/34* (2006.01)

(52) U.S. Cl.
CPC ........ *G06F 11/3409* (2013.01); *G06F 9/4843* (2013.01)

(58) Field of Classification Search
CPC .................................................. G06F 11/3409
USPC ........................................................ 718/103
See application file for complete search history.

(56) References Cited

U.S. PATENT DOCUMENTS

| | | | | |
|---|---|---|---|---|
| 10,296,377 | B1* | 5/2019 | Jonsson | G06F 9/4843 |
| 10,324,766 | B1* | 6/2019 | Karp | G06F 11/3068 |
| 10,990,439 | B1* | 4/2021 | Spivak | G06F 9/4843 |
| 2016/0253346 | A1* | 9/2016 | Greetham | G06F 16/148 |
| | | | | 707/754 |
| 2017/0351559 | A1* | 12/2017 | Rajagopal | G06F 11/0778 |
| 2018/0288137 | A1* | 10/2018 | Veeramani | H04L 67/34 |
| 2019/0179691 | A1* | 6/2019 | Xu | G06V 30/1985 |
| 2020/0159640 | A1* | 5/2020 | Sato | G06F 11/3065 |
| 2020/0252317 | A1* | 8/2020 | Westlin | H04L 41/5012 |
| 2021/0226961 | A1* | 7/2021 | Clark | G06F 9/5027 |
| 2021/0306432 | A1* | 9/2021 | Kim | H04L 67/303 |
| 2021/0374767 | A1* | 12/2021 | Kurian | G06Q 10/10 |
| 2021/0377076 | A1* | 12/2021 | Zhu | H04L 61/45 |
| 2022/0113938 | A1* | 4/2022 | Jha | G06F 11/076 |
| 2022/0350496 | A1* | 11/2022 | Mangaly | G06F 3/0622 |
| 2022/0398128 | A1* | 12/2022 | Jose, Jr. | G06F 9/4881 |
| 2023/0021278 | A1* | 1/2023 | Filsfils | H04L 45/566 |
| 2023/0168941 | A1* | 6/2023 | Mitra | G06F 9/5027 |
| | | | | 718/104 |

(Continued)

*Primary Examiner* — Mehran Kamran
(74) *Attorney, Agent, or Firm* — Jeffrey L. Streets

(57) ABSTRACT

A method may include various operations and a computer program product may cause a processor to perform various operations. The operations include receiving a task to be performed by a software application including numerous processing services, assigning a task identifier to the task before any processing service processes the task, and storing, for each processing service that processes the task, the task identifier in a record that associates the processing service identity with the task identifier in response to the processing service obtaining the task. Optional operations may further include detecting that the task has experienced a service event, identifying each of the processing services that processed the task prior to the service event, and collecting a service data log from each of the identified processing services. A service data archive may be formed with the service data logs collected from each of the identified processing services.

17 Claims, 6 Drawing Sheets

(56) References Cited

U.S. PATENT DOCUMENTS

| | | | |
|---|---|---|---|
| 2023/0251898 A1* | 8/2023 | Ji | G06F 9/4881 718/106 |
| 2023/0315604 A1* | 10/2023 | Cozma | G06F 11/3409 718/103 |

* cited by examiner

USING A TASK IDENTIFIER TO IDENTIFY PROCESSING SERVICES THAT HAVE PROCESSED A TASK

BACKGROUND

The present disclosure relates to methods of forming a service data archive for a task that experiences a service event.

BACKGROUND OF THE RELATED ART

Server systems and solutions may include a centralized resource management solution including a system management application and server that reduce complexity, speed response, and enhance the availability of the servers. The system management application may also enable a developer to create a service data archive for a failed operation by identifying a specific set of files or folders to be collected if the operation fails. The service files may then be saved, shared, and analyzed to identify the cause of a performance issue for a managed device.

The service data archive is made using a predetermined configuration that the developer programs into the system to identify the service data to be collected when there is a problem in the execution of the system management application code. Accordingly, the predetermined configuration of service data that goes into the service data archive is not visible to an end user and is not customizable by the end user. For example, if the system management application code makes a call to a system outside the system management application code, for example a call to a destination server to retrieve some data, and the call fails in the destination server, the failure is a problem in the execution flow of the system management application code and the system might dump corresponding service data. However, the service data included in the service data archive is driven by a predetermined configuration prepared by developers for each service. Unfortunately, if a new service is created and a corresponding configuration is not prepared, then a service data archive will not be generated. Furthermore, a service with an incomplete configuration may generate a service data archive that is not very useful.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise receiving a task to be performed by a software application including a plurality of processing services, assigning a task identifier to the task prior to the task being performed by any of the plurality of processing services, and storing, for each of the plurality of processing services that process the task, the task identifier assigned to the task in a record that associates the identity of the processing service with the task identifier in response to the processing service obtaining the task for processing.

DETAILED DESCRIPTION

Figure 1:
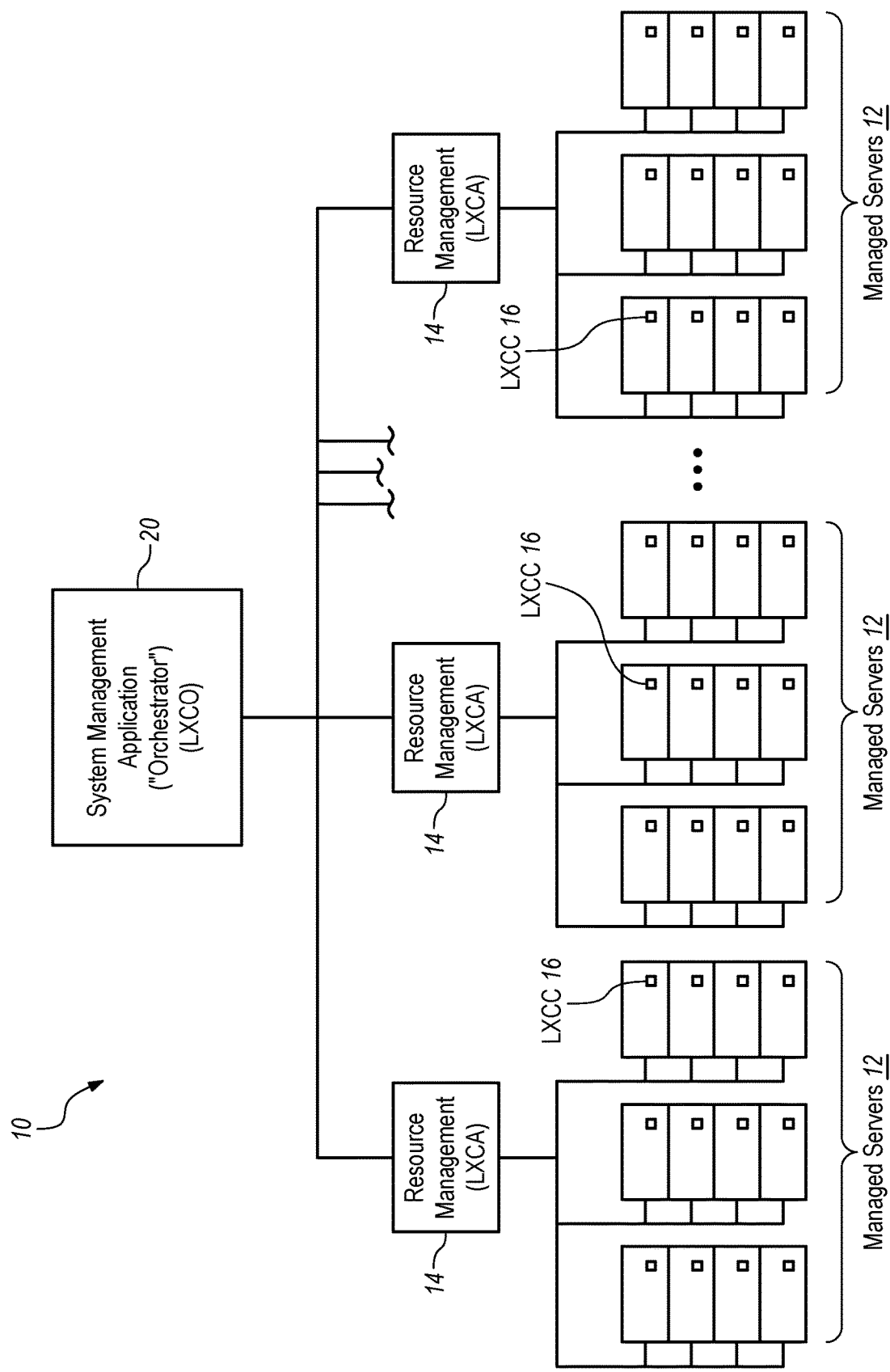
FIG. 1 is a diagram of a computing system that includes a system management application, such as an orchestrator.

Some embodiments provide a computer program product comprising a non-volatile computer readable medium and non-transitory program instructions embodied therein, the program instructions being configured to be executable by a processor to cause the processor to perform various operations. The operations comprise receiving a task to be performed by a software application including a plurality of processing services, assigning a task identifier to the task prior to the task being performed by any of the plurality of processing services, and storing, for each of the plurality of processing services that process the task, the task identifier assigned to the task in a record that associates the identity of the processing service with the task identifier in response to the processing service obtaining the task for processing.

In the context of a software application, "processing services" are independent programs or pieces of code that can run alone but may be used in conjunction with one or more other services to compose a product. For example, one software application could be built as a single big service that performs every function of the application, but another software application could be built having many processing services (perhaps more than 50 services) that each perform a specific function for the application. In one example, each of the processing services in a software application may be hosted in their own separate container and managed by a container orchestration system, such as the Kubernetes open-source container orchestration system. The software application may, for example, be a system management application.

The task may be any conceivable task that can be performed by a processor executing program instructions. Furthermore, the task may make use of some input data on which the task may operate. In one example, the software application may provide a user interface and the task to be performed by the software application may be received by the software application through user input initiating the task. To launch the task, the software application may submit an Application Programming Interface (API) call to an ingress service of the software application in response to the user input.

In one example of a task, a local service processor on a managed server, such as a baseboard management controller, detects and raises an event that should automatically generate a service ticket or notification. The event reaches the system management application, and a first processing service of the system management application receives and processes the event as a task (Processing Service #1) before broadcasting the task to other services in the system management application. A second processing service of the system management application may create a service ticket (Processing Service #2) and may also collect service data from the managed server to form a service data archive for inclusion in or with the service ticket. Once the service data archive has been collected, the service data archive may be parsed by another processing service (Processing Service #3) and analyzed by yet another processing service (Processing Service #4) by the system management application, such as LENOVO XCLARITY Orchestrator (LXCO). The service data archive may also be uploaded to the created ticket (Service #2). So, in response to a single simple event, the system management application processes the task in four different processing services.

The task identifier may have any chosen format, including a completely random string, so long as the task identifier is unique for a period of time until the task has finished processing. For example, if a given task can take one day to finish processing, then the task identifier for the given task should be unique for at least the duration of the task (i.e., one day), but preferably some multiple of an estimated task duration (i.e., three days) to provide a margin of error. The task identifiers assigned to tasks may be repeated from time to time, but the task identifier for any task should be unique while the task is still being processed. Optionally, the task identifier may be generated using a universally unique identifier (UUID) generator.

In some embodiments, the operations may further include detecting that the task has experienced a service event during processing. For example, the service event may be a failure of the task, such as may occur if the processing service becomes stalled or experiences an error condition. Task failure may be initially detected by a task tracker service in response to receiving no update regarding the processing of the task for more than a predetermined period of time. The operations may also include identifying, in response to detecting that the task has experienced a service event, each of the processing services that processed the task prior to the task experiencing the service event. A service data log may be collected from each of the identified processing services.

Some embodiments further include forming a service data archive that includes the service data logs collected from each of the identified processing services. Preferably, the service data archive does not include a service data log from any of the plurality of services that did not process the task. Where the service data logs are only collected from processing services that sequentially processed the task, it is possible to sort the service data logs included in the service data archive to be in chronologically order.

Some embodiments may provide the task identifier to a task tracker service in response to assigning the task identifier to the task so that the task tracker service may store the task identifier in a task identifier log. Each processing service that processed the task will preferably report to the task tracker service upon obtaining that task for processing, such as by reporting the task identifier and the identity of the processing service (i.e., a processing service identifier). The task tracker service may then store the processing service identifier in association with the task identifier for the purpose of tracking the processing progress of the task.

In some embodiments, each processing service may maintain a task identifier log that includes task identifiers for the tasks that the processing service has processed. In one example, for each of the processing services that process the task, the processing service stores the task identifier for the task in a task identifier log associated with the service. Optional operations may further include detecting that the task has experienced a service event during processing and broadcasting a message to each of the plurality of processing services in the software application in response to detecting that the task has experienced a service event. The message broadcast to each processing service includes the task identifier for the task that experienced the service event and requests that the processing service provide a service data log associated with the task identifier if the task identifier is stored in the task identifier log associated with the service. Processing services that determine they have not processed the task are not required to respond to the request or may provide an acknowledgement that they did not process the task. The operations may still further include causing, for each of the processing services that processed the task, the processing service to provide a service data log associated with the task identifier. In another option, the operations may include forming a service data archive that includes the service data log provided by each of the processing services that processed the task. A more specific example of the embodiments discussed in this paragraph may be found in reference to FIG. 3.

In some embodiments, the ingress service may forward the received task and the assigned task identifier to a message broker service, wherein each processing service that processes the task may then obtain the task from the message broker service. The record that associates the identity of the service with the task identifier may be stored in a task identifier log that is maintained by the message broker service in response to any of the processing services obtaining the task for processing. Optional operations may further include detecting that the task has experienced a service event, causing, in response to detecting that the task has experienced a service event, the message broker service to identify each of the processing services that processed the task prior to the task experiencing the service event using the records stored by the message broker service. A message may then be sent to each of the processing services identified by the message broker service, wherein the message includes the task identifier for the task that experienced the service event and requests that the processing service provide a service data log associated with the task identifier. For each of the processing services that processed the task, the processing service may be caused to provide a service data log associated with the task identifier. Then, in a further option, the operations may include forming a service data archive that includes the service data log provided by each of the identified processing services. A more specific example of the embodiments discussed in this paragraph may be found in reference to FIG. 4.

In some embodiments, the operations may further include reporting, for each of the processing services that obtain the task for processing, the task identifier for the task obtained by the processing service and the identity of the processing service to a service data archive service. Accordingly, the service data archive service may store the reported task identifier and the identity of the processing service in an entry of a task identifier log. Preferably, the processing service will report the task identifier to the service data archive service prior to the service starting processing of the task. Optional operations may further include detecting that the task has experienced a service event and causing, in response to detecting that the task has experienced a service event, the service data archive service to identify each of the processing services that processed the task prior to the task experiencing the service event using the task identifier log stored by the service data archive service. A message may then be sent to each of the processing services identified by the service data archive service as having processed the task, wherein the message includes the task identifier for the task that experienced the service event and a request that the processing service provide a service data log associated with the task identifier. The operations may include causing, for each of the processing services that receive the message, the processing service to provide a service data log associated with the task identifier. In a still further option, a service data archive service may form a service data archive that includes the service data logs provided by each of the processing services that processed the task. A more specific example of the embodiments discussed in this paragraph may be found in reference to FIG. 5.

In some embodiments, the operations further include automatically sending a service notification to a designated user address in response to detecting the service event, wherein the service notification identifies the service event experienced by the task. Furthermore, the service data archive may be provided in association with the service notification. For example, the service data archive or a link to the service data archive may be forwarded to the designated user address.

Some embodiments may collect a plurality of the records in a log over time, such as a task identifier log, wherein each record is time stamped at the time the record is stored. To keep the size of the task identifier logs to a minimum, records may be deleted from a task identifier log in a first-in, first out (FIFO) manner after a predetermined period of time since receipt or storage of the record. The predetermined period of time is preferably long enough for even a large task to be performed under a heavy load to have a margin of safety to prevent the deletion of data from the task identifier log and/or service data log that may still be needed for a service data archive.

Embodiments include automatically creating a custom service data archive for each task that experiences a service event, such as a task failure. The custom service data archive will include the necessary service data logs from only the services that were actually involved in processing the task that experienced the service event. Each task may be identified by a task identifier that is assigned to the task prior to execution of the task by one or more of the available services, and the corresponding custom service data archive may be associated with the task identifier.

Embodiments provide a system management application (software) that automatically and proactively identifies the services that become involved in the performance of the task, such that service data logs may be collected from the identified processing services in response to failure of the task. Specifically, the service data logs may be collected from each of the processing services that were involved in executing the task prior to or during the failure.

Some embodiments provide the technical benefit of avoiding the collection of service data logs from services that were not involved in performing the task. If a service was not involved in the performance of the task, then a service data log from that service is going to be irrelevant in the subsequent effort to determine a root cause of the failure of that task. Furthermore, the presence of irrelevant service data logs in the service data archive is highly undesirable because it merely clutters up the service data archive and must be sorted out or reviewed by a support engineer attempting to identify the root cause of the failure. It should be understood that a processing service may not process a task either because the processing service is unrelated to any portion of the task or because the task experienced a service event prior to the processing service obtaining the task for processing.

Some embodiments provide the additional technical benefit of enabling the individual service data logs, which are collected from individual processing services that were involved in performing the task, to be sorted chronologically within the service data archive. For any service data archive resulting from a failed task, the ability to sort individual service data logs in chronological order may increase efficiency in debugging issues on a large set of services and may allow for a faster determination of the root cause of the task failure or identification of event race conditions leading up to the task failure. Chronological sorting is facilitated by the fact that the service data archive does not include service data logs from processing services that were not involved in processing the task as would be the cast for a pre-configured set of service data logs.

Some embodiments provide the further technical benefit of eliminating the need for the developer to create a new configuration (a set of service data log settings) to define the scope of a service data archive for each new task or operation. In other words, since embodiments include automatically identifying the services from which a service data log will be collected in response to failure of a task, it is not necessary for a developer to identify a predetermined configuration of the processing services from which service data logs should be collect in response to failure of a specific task.

Embodiments may also provide the technical benefit of automatically creating service data archives for a complex task involving the processing by a large set of processing services. A complex task may be any task that requires the use of several different processing services to accomplish all of the functions required of the task. Nonlimiting examples of a complex task include a Call Home feature (i.e., service event notification) described above and/or a software or firmware update of numerous servers at one time.

In one example of a system management application, LENOVO XClarity Orchestrator has more than 50 unique processing services and the number of processing services is not limited. Nonlimiting examples of such processing services include (1) Monitoring—responsible to raise events and alerts; (2) Forwarding—responsible to offer APIs to allow other processing services to send emails, syslog, snmp traps; (3) Knowledge—responsible to manage information about the managed devices; (4) Managers—responsible to offer methods to connect different managers in the environment; (5) Service—responsible to execute processing services such as generating or collecting service data archives, or executing Call Home; (6) Warranty—responsible to offer methods for warranty retrieval and to maintain warranty information; and (7) Aggregation—responsible to generate new data types from already existing ones.

A "context" is a set of information, such as a set of data fields, that contain details about why the service (software code) is being executed, how the service is tracked, and/or who started the task involving the service. For example, a context in many distributed and multi-tenant architectures may contain: (1) an identifier (such as a hostname, a UUID or a given name) of the service that is executing the code, (2) an identifier of the tenant (such as an organization, group, etc.), (3) a task identifier assigned to the task, and (4) a Worker ID of a worker (such as a thread of execution) that is executing the task. Each task or action launched by someone (i.e., a user) or something (i.e., software code) is assigned a task identifier, which is kept for the entire lifetime of the execution of that task or action and should remain unique throughout execution of the task or action. The task identifier may be assigned to each task by an ingress service and the task identifier may be used to facilitate tracking a list of services that process some portion of the task. Embodiments that use a task identifier to identify a task may further share a full context rather than merely sharing the task identifier.

FIG. 1 is a diagram of a computing system 10 that includes a system management application 20, such as an orchestrator. The system management application 20 is just one example of a software application that may include any number of processing services. In the illustrated example, the system management application 20, such as the LENOVO® XCLARITY™ Orchestrator (LXCO) software solution, orchestrates multiple instances of a resource management application 14, such as LENOVO® XCLARITY™ Administrator (LXCA). LENOVO® XCLARITY™ Orchestrator provides centralized monitoring, management, provisioning and analytics for environments such as system 10 having a large number of managed devices, such as the managed servers 12. LENOVO® XCLARITY™ Administrator is a centralized resource management solution that is aimed at reducing complexity, speeding response, and enhancing the availability of Lenovo® server systems and solutions. LENOVO® XCLARITY™ Controller (LXCC) 16 (only three are marked with reference numbers) is a next-generation baseboard management controller (BMC) for servers, such as each of the managed servers 12. Each of the multiple instances of the resource management application 14 and the system management application 20 may each be run on a separate server.

Figure 2:
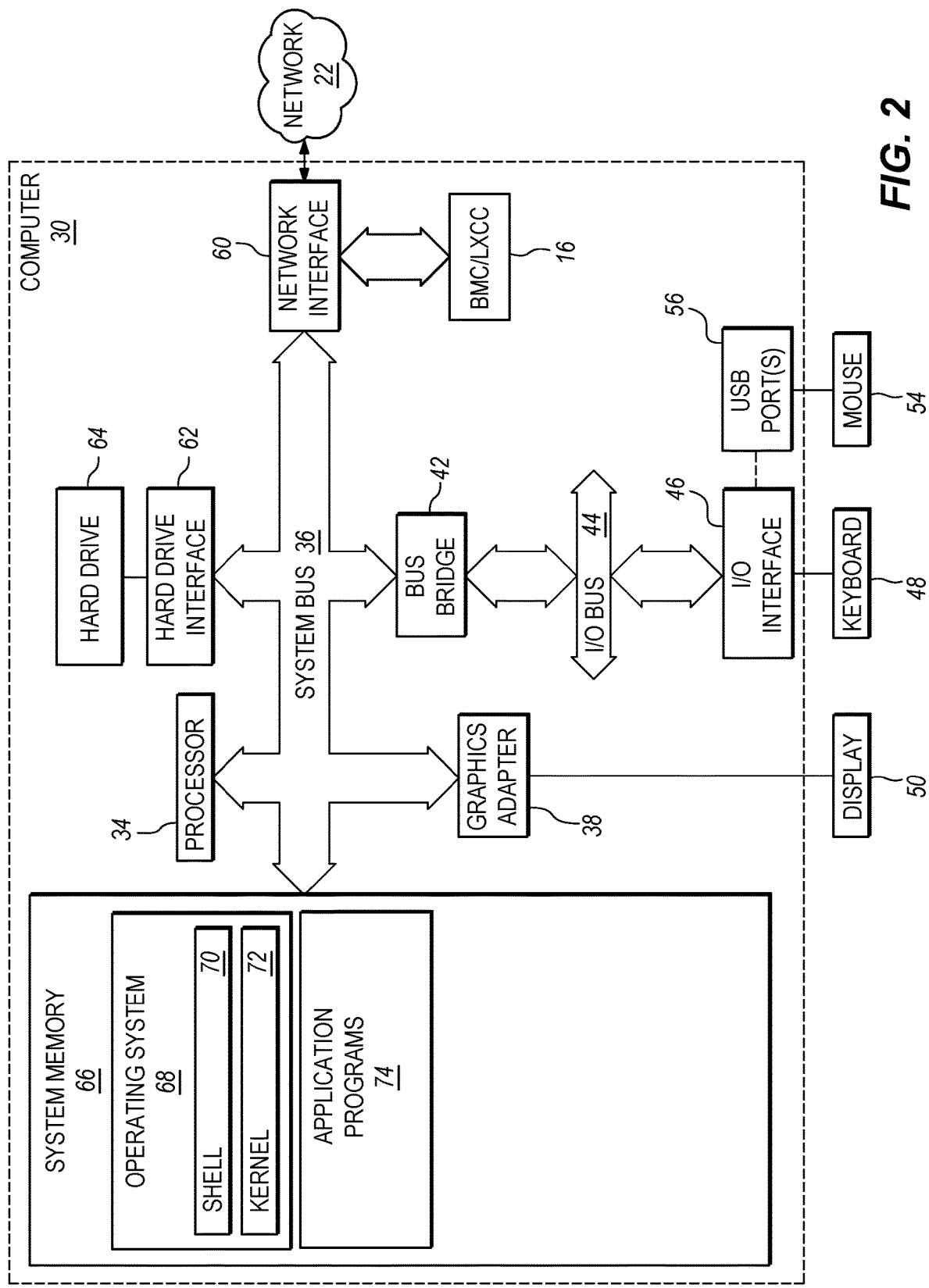
FIG. 2 is a diagram of one embodiment of a server that may be representative of the any one or more of the system management servers, compute nodes or servers, computer and the file server.

FIG. 2 is a diagram of one embodiment of a server 30 that may be representative of a system management server for running the system management application 20, one or more servers for running the resource management application 14, and/or one or more of the managed servers 12 as shown in FIG. 1. The server 30 includes a processor unit 34 that is coupled to a system bus 36. The processor unit 34 may utilize one or more processors, each of which has one or more processor cores. A graphics adapter 38, which drives/supports the display 50, is also coupled to system bus 36. The graphics adapter 38 may, for example, include a graphics processing unit (GPU). The system bus 36 is coupled via a bus bridge 42 to an input/output (I/O) bus 44. An I/O interface 46 is coupled to the I/O bus 44. The I/O interface 46 affords communication with various I/O devices, such as a keyboard 48 (perhaps as a touch screen virtual keyboard), and a USB mouse 54 via USB port(s) 56 (or other type of pointing device, such as a trackpad). As depicted, the server 30 may communicate with other devices over the network 22 using a network adapter or network interface controller 60. For example, where the server 100 represents a compute node or server 30, the server 30 may communicate with the system management application 20 and/or the resource management application 14 over a network consistent with system 10 of FIG. 1. The hardware elements depicted in the server 30 are not intended to be exhaustive, but rather are representative. For instance, the server 30 may include non-volatile memory and the like.

A hard drive interface 62 is also coupled to the system bus 36. The hard drive interface 62 interfaces with a hard drive 64. In a preferred embodiment, the hard drive 64 communicates with system memory 66, which is also coupled to the system bus 36. System memory is defined as the lowest level of volatile memory in the computer 30. This volatile memory may include additional higher levels of volatile memory (not shown), including, but not limited to, cache memory, registers and buffers. Data that populates the system memory 66 may include an operating system (OS) 68 and application programs 74. Embodiments of the application programs 74 may include a system management application 20 including program instructions that cause the processor 104 to perform the operations of the system management application. Alternatively, the application programs 74 may include a resource management application 14 (see FIG. 1) or, for example, a hypervisor where the server 30 is representative of the managed server 12 (see FIG. 1).

The operating system 68 includes a shell 70 for providing transparent user access to resources such as application programs 74. Generally, the shell 70 is a program that provides an interpreter and an interface between the user and the operating system. More specifically, the shell 70 executes commands that are entered into a command line user interface or from a file. Thus, the shell 70, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 72) for processing. Note that while the shell 70 may be a text-based, line-oriented user interface, embodiments may support other user interface modes, such as graphical, voice, gestural, etc.

As depicted, the operating system 68 also includes the kernel 72, which may include lower levels of functionality for the operating system 68, including providing essential services required by other parts of the operating system 68 and application programs 74. Such essential services may include memory management, process and task management, disk management, and mouse and keyboard management. As shown, the server 30 includes application programs 74 in the system memory of the server 30, which application programs may include, without limitation, a system management application.

In some embodiments, the server 30 may be representative of the hardware configuration of a managed compute node or server 12. Accordingly, the server 30 may further include a service processor, such as a baseboard management controller (BMC) or LENOVO® XCLARITY™ Controller (LXCC) 16. The BMC/LXCC 16 may be used to perform out-of-band processing and may monitor and manage various features of the hardware components of the server. Furthermore, the BMC 32 may report events occurring on the server 30 to a system management application and/or control certain aspects of the server 30, such as performing a firmware update where the server 30 is representative of a managed server 12 of FIG. 1.

Figure 3:
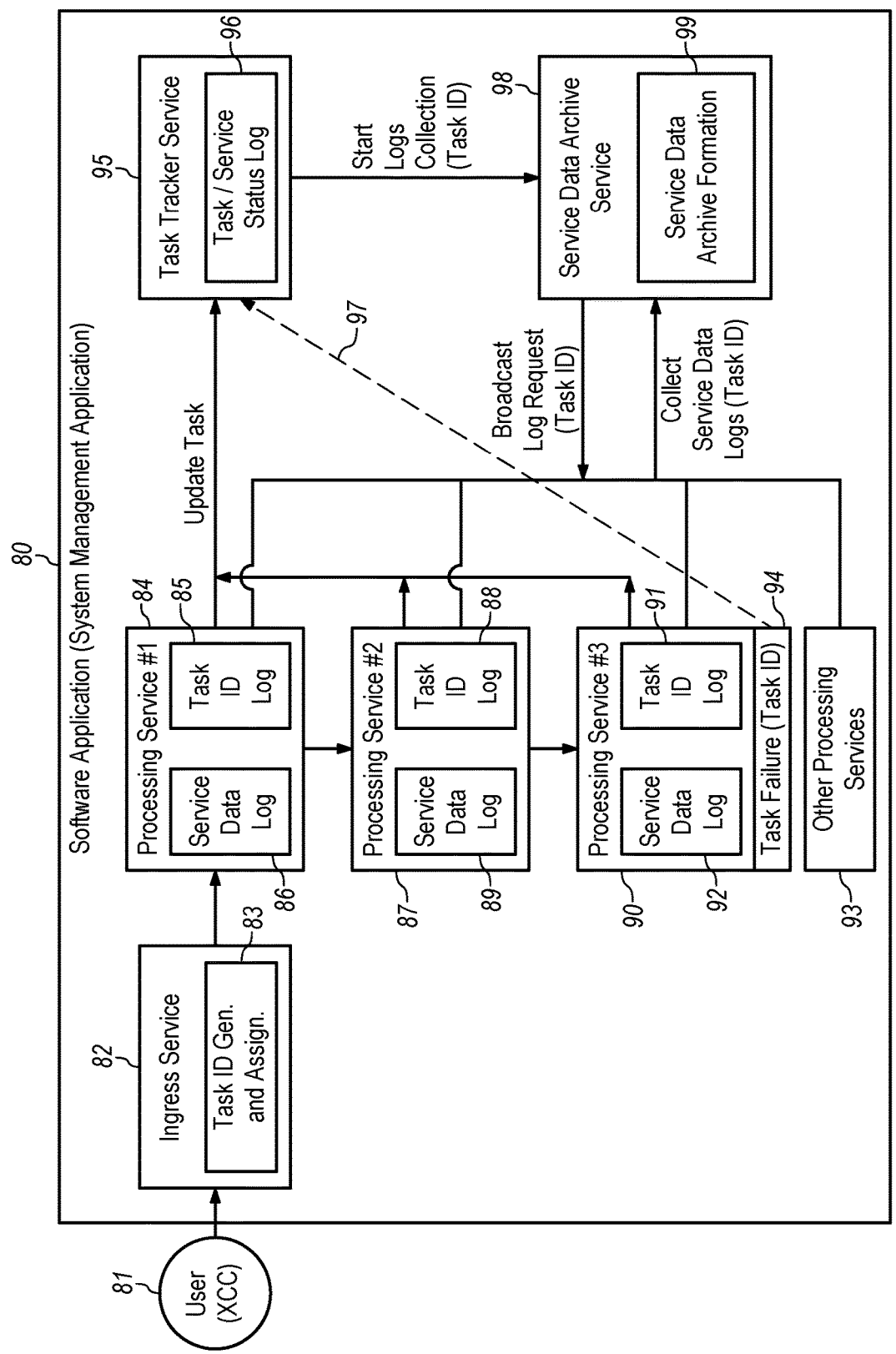
FIG. 3 is a diagram of a system management application illustrating a process for tracking services that participate in processing a task according to a first embodiment.

FIG. 3 is a diagram of a system management application 80 illustrating various services or modules performing a process for processing a task according to a first embodiment. A user 81 may interact with a user interface of the system management application 80 to initiate or launch a task or action, such as updating software on a managed server. Launching the task may include an Application Programming Interface (API) call that is received by an ingress service 82. In response to receiving the task, a task identifier generation and assignment module 83 of the ingress service 82 assigns a task identifier to the task before sending the task to a first processing service 84. The task identifier will be the same for the task no matter where the task is executed. Optionally, the task identifier generation and assignment module 83 may generate the task identifier using a universally unique identifier (UUID) generator.

The task may be a complex task requiring processing by a series of processing services as illustrated by the arrows in FIG. 3. Specifically, FIG. 3 shows the task being sequentially processed by a first processing service 84 ("Processing Service #1"), a second processing service 87 ("Processing Service #2"), and then by a third processing service 90 ("Processing Service #3"). Each processing service of the system management application stores its own separate log of task identifiers ("task identifiers log") 85, 88, 91, respectively, for the tasks that the processing service has processed. The task identifiers log stored by a processing service may be retained for a predetermined or variable period of time, but it is not necessary to retain the task identifiers log indefinitely. For example, entries in the task identifiers log may be deleted in a first-in, first out (FIFO) manner after a period of time, such as about 6 hours or a day, depending upon the implementation and needs. However, individual entries in the task identifiers log lose their importance after the particular task has been successfully completed or, if the particular task failed, after the service data logs 86, 89, 92, respectively, have been collected from the processing services and saved as a service data archive. The service data archive is used for subsequent analysis to determine a cause of the failure.

Each task may be reported to a task tracker service 95 that stores the task identifier for the task in a task/service status log 96. Each task is preferably reported to the task tracker service 95 as soon as the ingress service provides the task to a first processing service. The task tracker service stores an entry in the task/service status log 96 for each task that is being executed by one or more of the processing services, where each task is identified by its unique task identifier. Each processing service 84, 87, 90 (and potentially other processing services 93) that subsequently processes the task may then report their processing service identifier and the task identifier for the task to the task tracker service 95. Accordingly, the task tracker service 95 may update the task/service status log 96 with the same task identifier to reflect the identity of the processing service that is currently processing the task. A user or other service of the system management application may use the task/service status log 96 to audit and/or monitor the progress of a task or action, such as to monitor a task that is taking a longer than normal amount of time to finish processing.

Should a task experience a service event, such as a task failure (see "Task Failure" 94 associated with the third processing service #3 90), during processing by any of the services (i.e., processing service #n), the task failure and the task identifier may be reported to the task tracker service 95 (see dashed arrow 97). The task tracker service 95 may, in response to the report of the task failure, instruct a service data archive service 98 (alternatively referred to as a Service & Support server) to capture the service data logs associated with the task identifier that identifies the failed task from each service that processed the task. Since neither the task tracker service 95 nor the service data archive service 98 have a complete list of services that processed the task up to the point of failure, the service data archive service 98 may broadcast a request for service data logs to all of the processing services in the system management application. Specifically, each request includes the task identifier that uniquely identifies the failed task that caused the service data archive service to send the request. Because the task identifier for a task remains unchanged throughout all processing of the task (i.e., from assignment of the task identifier to a task until processing of the task has finished successfully or has failed), the request sent to each processing service will identify the same single, unique task identifier for the task. Each processing service then searches their own task identifier log for the requested task identifier to determine whether the processing service has processed that particular task. Any processing service that finds the task identifier in their task identifier log will then provide their service data log to the service data archive service. In this example, the first processing service 84, the second processing service 87 and the third processing service 90 processed the task, whereas any number of the other processing services 93 did not process the task, perhaps due to the task failure event 94 or because the function associated with the processing service was not relevant to the task.

The service data archive service 98 broadcasts the service data log requests to all of the processing services and collects service data logs from each processing service that processed the task (here only processing services 84, 87, 90). A service data archive formation module 99 may then combine the collected service data logs to form a service data archive that is useful in diagnosing the root cause of the task failure.

Figure 4:
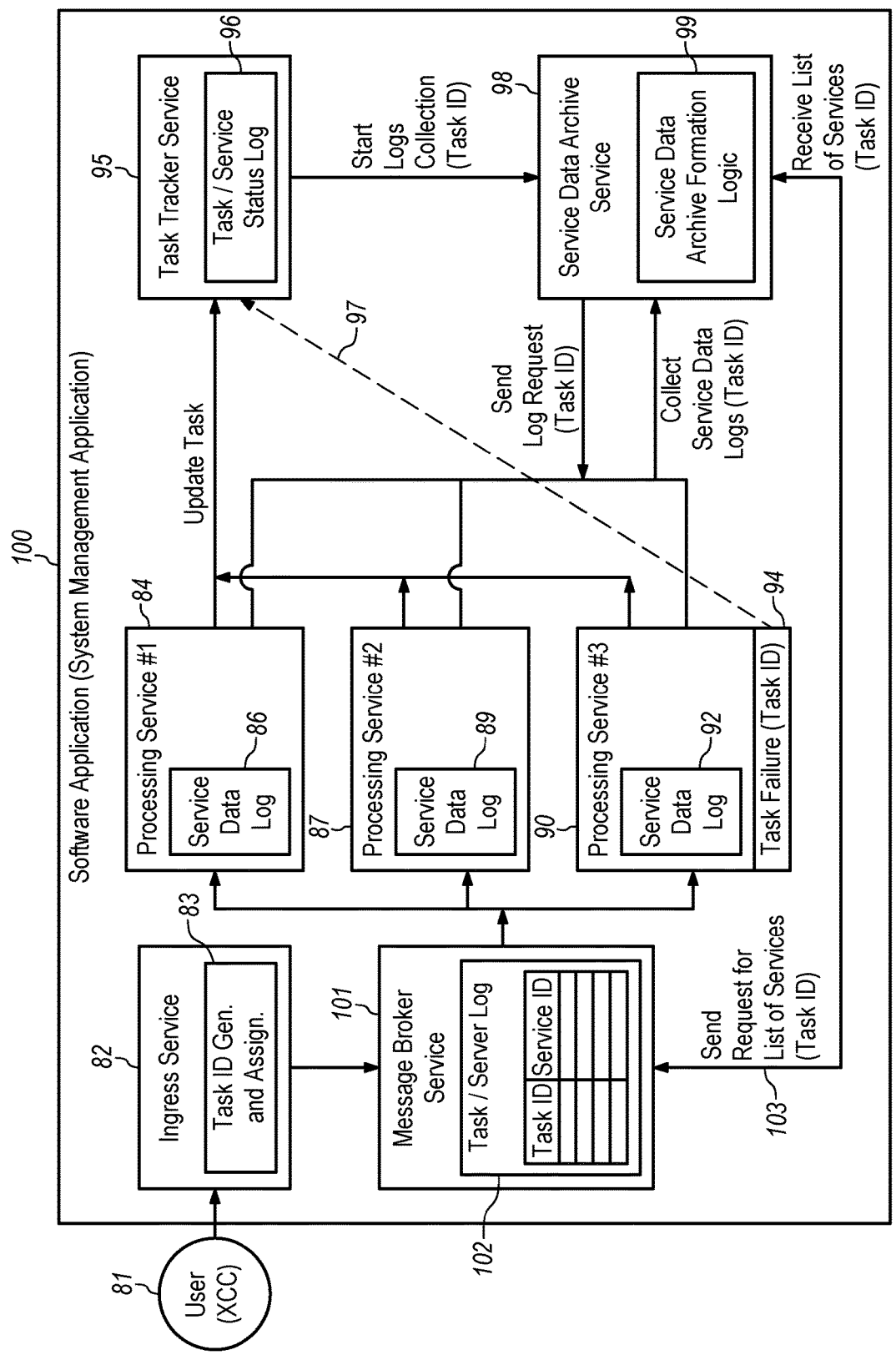
FIG. 4 is a diagram of a system management application illustrating a process for tracking services that participate in processing a task according to a second embodiment.

FIG. 4 is a diagram of a system management application 100 illustrating various services or modules performing a process for processing a task according to a second embodiment. Elements in FIG. 4 that are similar to the elements of FIG. 3 may be referred to using the same references numbers as used in FIG. 3. As with the system 80 and process of FIG. 3, a user 81 may interact with a user interface of the system management application 100 to initiate or launch a task or action, such as updating software on a managed server. Launching the action may include an Application Programming Interface (API) call that is received by an ingress service 82. In response to receiving a task, a task identifier generation and assignment module 83 of the ingress service 82 assigns a task identifier to this task before sending the task to a processing service. The task identifier will be the same for the task context no matter which processing service is processing the task.

In this second embodiment, the ingress service 82 forwards the task or action, along with its task identifier, to a message broker service 101 (or simply "message broker") from where the task will be picked up for processing by one or more processing services 84, 87, 90 (other processing services are not illustrated). The task may be a complex task that is executed by multiple processing services. Each processing service that needs to process the task will sequentially obtain the task from the message broker service 101. Furthermore, every time that one of the processing services 84, 87, 90 obtains the task, or any other task, from the message broker service 101, the message broker service 101 will log the task identifier associated with the task and the identity of the processing service (i.e., one of the processing services #1 to #n) that obtained the task in a task/service log 102. Here, the task/service log 102 is illustrated as a table, but any data structure that maintains an association between the task ID and the processing service ID is suitable.

As in FIG. 3, each task may be reported to a task tracker service 95 that stores the task identifier for the task in a task/service status log 96. Each task is preferably reported to the task tracker service 95 as soon as the ingress service 82 provides the task to a first processing service. The task tracker service 95 stores an entry in the task/service status log 96 for each task that is being executed by one or more of the processing services, where each task is identified by its unique task identifier. Each processing service that subsequently processes a task may then report their processing service identifier and the task identifier for the task to the task tracker service 95 for recording in the task/service status log 96. Accordingly, the task tracker service 95 may update the task tracker log with the same task identifier to reflect the identity of the processing service that is currently processing the task. A user 81 or other service of the system management application may use the task/service status log 96 to audit and/or monitor the progress of a task or action, such as to monitor a task that is taking a longer than normal amount of time to finish processing.

Should a task experience a service event, such as a task failure (see "Task Failure" 94 associated with the third processing service #3 90), during processing by any of the services (i.e., processing service #n), the task failure and the task identifier may be reported to the task tracker service 95 (see dashed arrow 97). The task tracker service 95 may, in response to the report of the task failure, instruct a service data archive service 98 (alternatively referred to as a Service & Support server) to capture the service data logs associated with the task identifier that identifies the failed task from each service that processed the task.

In this embodiment, the message broker service 101 has a complete log of all processing services that executed any part of the task. Accordingly, the service data archive service 98 may send a single request (see arrow 103) to the message broker service 101 identifying the task identifier and requesting a list identifying all of the processing services that performed processing on the task having the identified task identifier. Specifically, the message broker may search its own task/service log 102 to locate entries containing the identified task identifier, and then compile a list of the processing services contained in those same entries as the task identifier. After the service data archive service 98 has received from the message broker service 101 the list of all processing services that processed the task having the identified task identifier, the service data archive service 98 sends a request to each of the processing services identified in the received list (here, the first processing service 84, the second processing service 87 and the third processing service 90) requesting that the processing service 84, 87, 90 provide their respective service data logs 86, 89, 92. The service data archive service 98 will collect each service data log received from the listed services and use the service data archive formation module 99 to form a service data archive.

Figure 5:
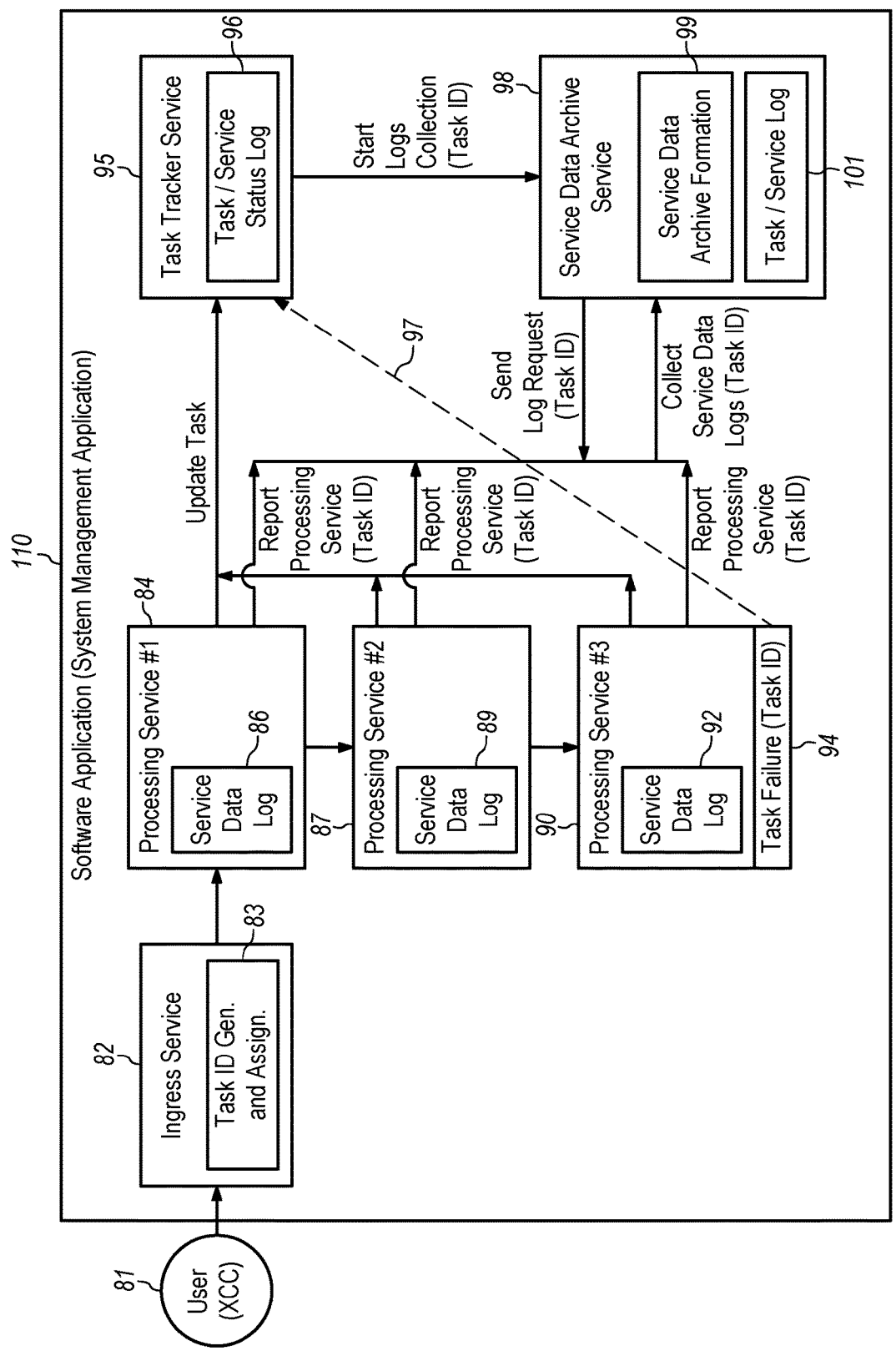
FIG. 5 is a diagram of a system management application illustrating a process for tracking services that participate in processing a task according to a third embodiment.

FIG. 5 is a diagram of a system management application 110 illustrating various services or modules performing a process for processing a task according to a third embodiment. Elements in FIG. 5 that are similar to the elements of FIGS. 3 and/or 4 may be referred to using the same references numbers as used in FIGS. 3 and/or 4.

A user 81 may interact with a user interface of the system management application 80 to initiate or launch a task or action, such as updating software on a managed server. Launching the task may include an Application Programming Interface (API) call that is received by an ingress service 82. In response to receiving the task, a task identifier generation and assignment module 83 of the ingress service 82 assigns a task identifier to the task before sending the task to a first processing service 84. The task identifier will be the same for the task no matter where the task is) executed. Optionally, the task identifier generation and assignment module 83 may generate the task identifier using a universally unique identifier (UUID) generator.

Each task may be reported to a task tracker service 95 that stores the task identifier for the task in a task/service status log 96. Each task is preferably reported to the task tracker service 95 as soon as the ingress service provides the task to a first processing service. The task tracker service stores an entry in the task/service status log 96 for each task that is being executed by one or more of the processing services, where each task is identified by its unique task identifier. Each processing service 84, 87, 90 (and potentially other processing services 93) that subsequently processes the task may then report their processing service identifier and the task identifier for the task to the task tracker service 95. Accordingly, the task tracker service 95 may update the task/service status log 96 with the same task identifier to reflect the identity of the processing service that is currently processing the task. A user or other service of the system management application may use the task/service status log 96 to audit and/or monitor the progress of a task or action, such as to monitor a task that is taking a longer than normal amount of time to finish processing.

The task may be a complex task requiring processing by a series of processing services as illustrated by the arrows in FIG. 5. Specifically, the task is illustrated being sequentially processed by a first processing service 84 ("Processing Service #1"), a second processing service 87 ("Processing Service #2"), and then by a third processing service 90 ("Processing Service #3"). According to this third embodiment, each processing service 84, 87, 90 that processes a task informs the service data archive service 98 of the task identifier for the task that the processing service is processing. The service data archive service 98 stores this information in a task/service log 101, wherein each entry of the task/service log 101 includes both the processing service identifier for the processing service processing the task and the task identifier for the task being processed by the processing service. Each processing service 84, 87, 90 preferably reports the task identifier to the service data archive service 98 prior to the processing service starting execution or processing of the task. Accordingly, if the task fails as soon as a processing service begins processing the task, the service data archive service 98 will already have an entry in the task/service log 101 to reflect the fact that the processing service was processing the task at the time the task failed.

In the event that the task experiences a service event, such as a task failure (see "Task Failure" 94 associated with the third processing service #3 90), during processing by any of the services (i.e., processing service #n), the task failure and the task identifier may be reported to the task tracker service 95 (see dashed arrow 97). The task tracker service 95 may, in response to the report of the task failure, instruct a service data archive service 98 (alternatively referred to as a Service & Support server) to capture the service data logs associated with the task identifier that identifies the failed task from each service that processed the task. Optionally for any of the embodiments, the task failure 94 could be reported directly to the service data archive service 98 or to both the task tracker service 95 and service data archive service 98.

In response to being notified that the task has experienced a service event, the service data archive service 98 may send a request for service data logs to each of the processing services 84, 87, 90 that the task/service log 101 identifies as having processed some portion of that task having the identified task identifier. Specifically, each request sent to a processing service includes the task identifier that uniquely identifies the failed task. Because the request for service data logs is only sent to services known to the service data archive service 98 as having processed the task having the task identifier, there is no need for each processing service 84, 87, 90 to determine whether the processing service processed that task. Accordingly, the processing services do not need to maintain their own task identifier log. Each processing service that receives a request from the service data archive service 98 will then provide a service data log to the service data archive service 98, and the service data archive service will collect each service data log. the service data archive service 98 may then use to the service data archive formation module 99 to form a service data archive containing the collected service data logs.

The third embodiment (see FIG. 3) is similar to the first embodiment (see FIG. 1) except that the processing services 84, 87, 90 are proactive about reporting the task identifier and service identifier for each task that the processing service is processing to the service data archive service 98. By reporting the task identifier and the service identifier to the service data archive service 98 in a contemporaneous, proactive manner, the task/service log 101 includes the task identifiers and processing service identifiers for tasks processed by each processing service such that the individual processing services do not need to store a task identifier log. As a result, the service data archive service 98 may also send requests for service data logs to those processing services 84, 87, 90 that are known to have processed the task having the task identifier. This has the effect) of reducing an amount of processing performed, since processing services that did not process the task do not receive a request and do not need to determine whether they processed the task.

Figure 6:
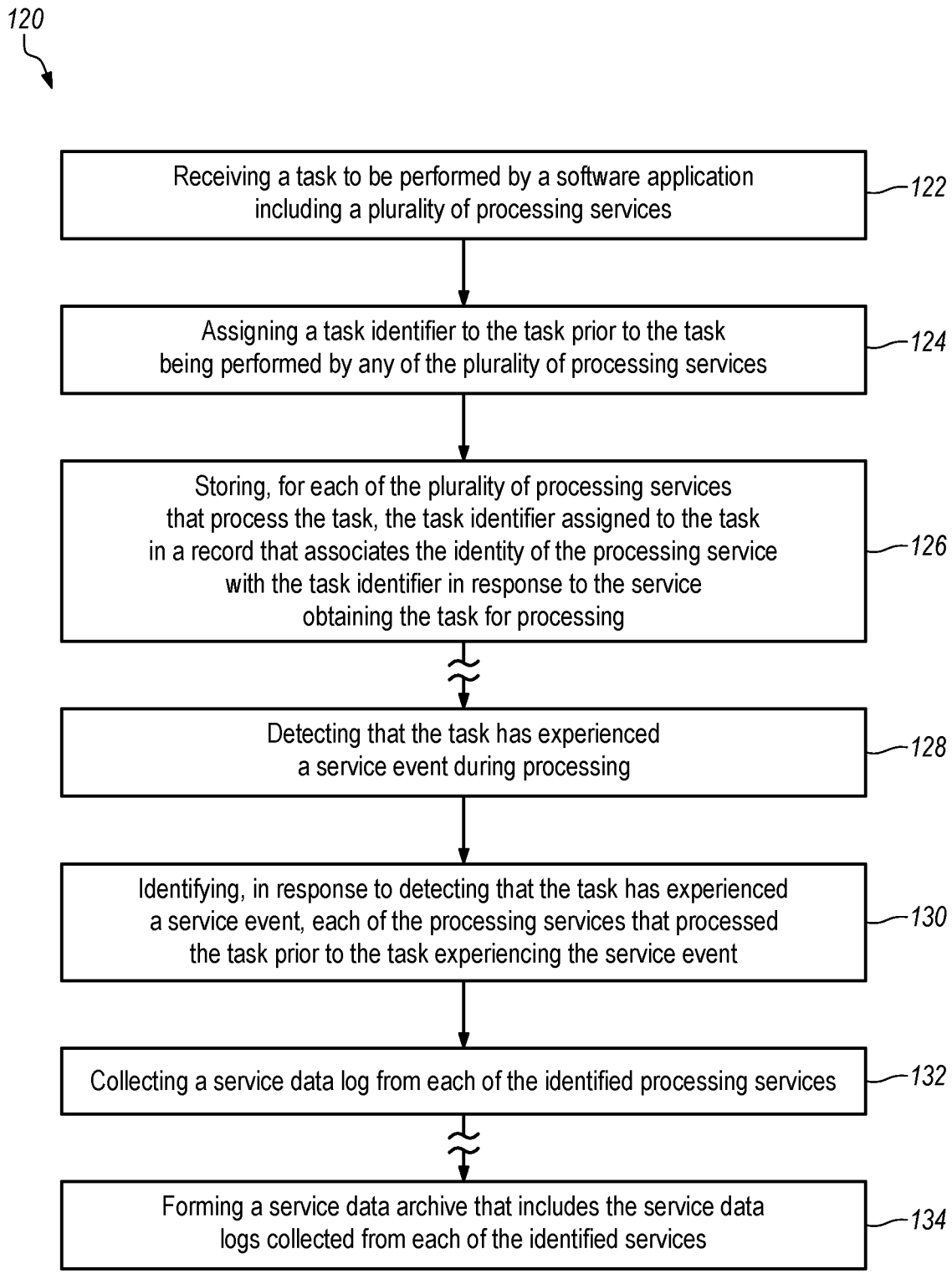
FIG. 6 is a flowchart of operations according to some embodiments.

FIG. 6 is a flowchart of operations 120 according to some embodiments. Operation 122 includes receiving a task to be performed by a software application including a plurality of processing services. Operation 124 includes assigning a task identifier to the task prior to the task being performed by any of the plurality of processing services. Operation 126 includes storing, for each of the plurality of processing services that process the task, the task identifier assigned to the task in a record that associates the identity of the processing service with the task identifier in response to the service obtaining the task for processing.

In some embodiments, the operations 120 continue. Operation 127 includes detecting that the task has experienced a service event during processing. Operation 130 includes identifying, in response to detecting that the task has experienced a service event, each of the processing services that processed the task prior to the task experiencing the service event. Operation 132 includes collecting a service data log from each of the identified services. The operations 120 may optionally further continue with operation 134 which includes forming a service data archive that includes the service data logs collected from each of the identified services.

The foregoing computer program products may further include program instructions for implementing or initiating any one or more aspects of the methods described herein. Accordingly, a separate description of the methods will not be duplicated in the context of a computer program product.

The foregoing system may further process the program instructions to implement or initiate any one or more aspects of the methods described herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program) instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates) otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   receiving a task to be performed by a software application including a plurality of processing services;
   assigning a task identifier to the task prior to the task being performed by any of the plurality of processing services;
   processing the task using one or more of the processing services;
   storing, for each of the one or more processing services that process the task, the task identifier assigned to the task in a record that associates the identity of the processing service with the task identifier in response to the processing service obtaining the task for processing;
   detecting that the task has experienced a service event during processing;
   identifying, in response to detecting that the task has experienced a service event, each of the one or more processing services that processed the task prior to the task experiencing the service event;
   transmitting a message to each of the plurality of processing services, wherein the message includes the task identifier for the task that experienced the service event and requests that the processing service provide a service data log associated with the task identifier, and wherein each of the identified processing services is configured to generate the provided service data log based on a task identifier log associated respectively with the processing service in which task identifiers of tasks processed by the processing service are stored; and
   collecting, in response to detecting that the task has experienced a service event, a service data log from each of the identified processing services.

2. The computer program product of claim 1, the operations further comprising:
   forming a service data archive that includes the service data logs collected from each of the identified processing services and does not include a service data log from any of the plurality of processing services that did not process the task.

3. The computer program product of claim 2, the operations further comprising:
   sorting the service data logs included in the service data archive to be in chronological order.

4. The computer program product of claim 1, wherein the software application is a system management application.

5. The computer program product of claim 1, the operations further comprising:
   provide a user interface, wherein receiving the task to be performed by the software application includes the software application receiving user input initiating the task.

6. The computer program product of claim 1, the operations further comprising:
   providing the task identifier to a task tracker service in response to assigning the task identifier to the task; and
   the task tracker service storing the task identifier in a task identifier log.

7. The computer program product of claim 1, the operations further comprising:
   forming a service data archive that includes the service data log provided by each of the processing services that processed the task.

8. The computer program product of claim 1, the operations further comprising:
   forwarding the received task and the assigned task identifier to a message broker service; and
   each of the one or more processing services that process the task obtaining the task from the message broker service, wherein the record that associates the identity of the processing service with the task identifier is stored in a task identifier log by the message broker service in response to the processing service obtaining the task for processing.

9. The computer program product of claim 8, the operations further comprising:
causing, in response to detecting that the task has experienced a service event, the message broker service to identify each of the one or more processing services that processed the task prior to the task experiencing the service event using the records stored by the message broker service;
sending a message to each of the one or more processing services identified by the message broker service, wherein the message includes the task identifier for the task that experienced the service event and requests that the processing service provide a service data log associated with the task identifier; and
causing, for each of the one or more processing services that processed the task, the processing service to provide a service data log associated with the task identifier.

10. The computer program product of claim 9, the operations further comprising:
forming a service data archive that includes the service data logs provided only by each of the identified processing services.

11. The computer program product of claim 1, the operations further comprising:
reporting, for each of the one or more processing services that obtain the task for processing, the task identifier for the task obtained by the processing service and the identity of the processing service to a service data archive service; and
the service data archive service storing the reported task identifier and the identity of the processing service in an entry of a task identifier log.

12. The computer program product of claim 11, the operations further comprising:
causing, in response to detecting that the task has experienced a service event, the service data archive service to identify each of the one or more processing services that processed the task prior to the task experiencing the service event using the task identifier log stored by the service data archive service;
sending a message to each of the one or more processing services identified by the service data archive service as having processed the task, wherein the message includes the task identifier for the task that experienced the service event and requests that the processing service provide a service data log associated with the task identifier; and
causing, for each of the one or more processing services that receive the message, the processing service to provide a service data log associated with the task identifier.

13. The computer program product of claim 12, the operations further comprising:
forming a service data archive that includes the service data logs provided only by each of the one or more processing services that processed the task.

14. The computer program product of claim 13, the operations further comprising:
automatically sending a service notification to a designated user address in response to detecting the service event, wherein the service notification identifies the service event experienced by the task; and
providing the service data archive in association with the service notification.

15. The computer program product of claim 1, wherein the service event is a failure of the task.

16. A computer program product comprising a non-volatile computer readable medium and non-transitory program instructions embodied therein, the program instructions being configured to be executable by a processor to cause the processor to perform operations comprising:
receiving a task to be performed by a software application including a plurality of processing services;
assigning a task identifier to the task prior to the task being performed by any of the plurality of processing services;
processing the task using one or more of the processing services;
storing, for each of the one or more processing services that process the task, the task identifier assigned to the task in a record that associates the identity of the processing service with the task identifier in response to the processing service obtaining the task for processing;
detecting that the task has experienced a service event during processing;
identifying, in response to detecting that the task has experienced a service event, each of the one or more processing services that processed the task prior to the task experiencing the service event; and
collecting, in response to detecting that the task has experienced a service event, a service data log from each of the identified processing services; and
automatically sending a service notification to a designated user address in response to detecting the service event, wherein the service notification identifies the service event experienced by the task, wherein each of the plurality of the processing services of the software application are hosted in a separate container and managed by a container orchestration system.

17. A computer program product comprising a non-volatile computer readable medium and non-transitory program instructions embodied therein, the program instructions being configured to be executable by a processor to cause the processor to perform operations comprising:
receiving a task to be performed by a software application including a plurality of processing services;
assigning a task identifier to the task prior to the task being performed by any of the plurality of processing services;
processing the task using one or more of the processing services;
reporting, for each of the one or more processing services that process the task, the task identifier for the task obtained by the processing service and the identity of the processing service to a service data archive service;
the service data archive service storing the reported task identifier and the identity of the processing service in an entry of a task identifier log, wherein the entry associates the identity of the processing service with the task identifier;
detecting that the task has experienced a service event during processing;
causing, in response to detecting that the task has experienced a service event, the service data archive service to identify each of the one or more processing services that processed the task prior to the task experiencing the service event using the task identifier log stored by the service data archive service;

sending a message to each of the one or more processing services identified by the service data archive service as having processed the task, wherein the message includes the task identifier for the task that experienced the service event and requests that the processing service provide a service data log associated with the task identifier;

causing, for each of the one or more processing services that receive the message, the processing service to provide a service data log associated with the task identifier;

forming a service data archive that includes the service data logs provided only by each of the one or more processing services that processed the task;

automatically sending a service notification to a designated user address in response to detecting the service event, wherein the service notification identifies the service event experienced by the task; and providing the service data archive in association with the service notification.

\* \* \* \* \*